(12) United States Patent
Pochardt et al.

(10) Patent No.: US 7,828,192 B2
(45) Date of Patent: Nov. 9, 2010

(54) AMPLITUDE ADJUSTMENT OF AN ULTRASONIC HORN

(75) Inventors: Donald L. Pochardt, Hastings, MN (US); Satinder K. Nayar, Woodbury, MN (US); Paul M. Fettig, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 492 days.

(21) Appl. No.: 11/268,141

(22) Filed: Nov. 7, 2005

(65) Prior Publication Data

US 2006/0144902 A1 Jul. 6, 2006

Related U.S. Application Data

(60) Provisional application No. 60/640,978, filed on Jan. 3, 2005, provisional application No. 60/641,048, filed on Jan. 3, 2005.

(51) Int. Cl.
*B23K 1/06* (2006.01)
(52) U.S. Cl. ............... 228/110.1; 228/1.1; 156/73.1
(58) Field of Classification Search ............. 228/1.1, 228/110.1; 156/73.1, 580.1
See application file for complete search history.

(56) References Cited

U.S. PATENT DOCUMENTS

| | | | |
|---|---|---|---|
| 3,405,024 A | 10/1968 | Attwood et al. | |
| 3,438,428 A | 4/1969 | Balamuth et al. | |
| 3,737,361 A | 6/1973 | Obeda | |
| 3,764,442 A * | 10/1973 | Parry | 228/1.1 |
| 4,227,959 A | 10/1980 | Brown | |
| 4,313,778 A * | 2/1982 | Mims | 156/358 |
| 4,423,793 A | 1/1984 | Caris | |
| 4,587,958 A | 5/1986 | Noguchi et al. | |
| 4,646,957 A | 3/1987 | Nuss | |
| 5,044,543 A * | 9/1991 | Yamazaki et al. | 228/110.1 |
| 5,138,127 A | 8/1992 | Fries et al. | |
| 5,199,518 A | 4/1993 | Woodle | |
| 5,637,947 A * | 6/1997 | Kising et al. | 310/316.01 |

(Continued)

FOREIGN PATENT DOCUMENTS

DE 37 23 933 A1 2/1989

(Continued)

OTHER PUBLICATIONS

U.S. Appl. No. 11/321,677, filed on Dec. 29, 2005, claiming priority to U.S. Appl. No. 60/640,978, filed on Jan. 3, 2005, now expired; Inventors: Satinder K. Nayar, Donald Oblak.

(Continued)

*Primary Examiner*—Kevin P Kerns
*Assistant Examiner*—Devang R Patel
(74) *Attorney, Agent, or Firm*—Daniel R. Pastirik

(57) ABSTRACT

A system and method for maintaining a substantially constant gap between a horn and an anvil includes the act of positioning a horn proximal an anvil, so that a gap is established between the horn and the anvil. An alternating current (AC) signal is applied to a converter coupled to the horn. The AC signal exhibits an amplitude. The amplitude of the AC signal is adjusted during operation of the horn, so as to maintain the gap between the horn and the anvil substantially constant.

13 Claims, 14 Drawing Sheets

U.S. PATENT DOCUMENTS

| | | | |
|---|---|---|---|
| 5,772,814 | A | 6/1998 | Grewell |
| 5,976,316 | A | 11/1999 | Mlinar et al. |
| 6,120,629 | A * | 9/2000 | Shannon et al. ............ 156/73.1 |
| 6,131,795 | A | 10/2000 | Sato |
| 6,190,296 | B1 | 2/2001 | Gnad et al. |
| 6,287,403 | B1 | 9/2001 | Couillard et al. |
| 6,336,803 | B1 | 1/2002 | Funger et al. |
| 6,497,949 | B1 | 12/2002 | Hyde et al. |
| 6,555,767 | B1 | 4/2003 | Lockery et al. |
| 6,620,270 | B2 | 9/2003 | Ehlert et al. |
| 6,634,539 | B2 | 10/2003 | Mlinar et al. |
| 6,863,136 | B2 | 3/2005 | Bar-Cohen et al. |
| 6,902,101 | B2 | 6/2005 | Horie et al. |
| 6,910,392 | B2 | 6/2005 | Lockery et al. |
| 7,059,103 | B2 | 6/2006 | Ninomiya et al. |
| 2002/0062903 | A1 | 5/2002 | Couillard et al. |
| 2002/0074380 | A1* | 6/2002 | Ellner et al. ............ 228/110.1 |
| 2003/0057259 | A1 | 3/2003 | Mlinar et al. |
| 2004/0050474 | A1 | 3/2004 | Kubik et al. |
| 2005/0063444 | A1 | 3/2005 | Frick |
| 2006/0144905 | A1 | 7/2006 | Oblak et al. |
| 2006/0149485 | A1 | 7/2006 | Oblak et al. |

FOREIGN PATENT DOCUMENTS

| | | |
|---|---|---|
| DE | 100 63 018 | 7/2002 |
| DE | 103 31 064 A1 | 2/2005 |
| JP | 9-057 853 A | 3/1997 |
| JP | 1999/314168 A | 11/1999 |
| JP | 2004/330228 A | 11/2004 |
| JP | 2005/028382 A | 2/2005 |
| WO | WO 96/14202 A | 5/1996 |
| WO | WO 01/59025 | 8/2001 |

OTHER PUBLICATIONS

U.S. Appl. No. 11/322,477, filed on Dec. 30, 2005, claiming priority to U.S. Appl. No. 60/641,048, filed on Jan. 3, 2005, now expired; Inventors: Donald S. Oblak, Satinder K. Nayar, John R. Mlinar, Donald L. Pochardt, Paul M. Fettig.

Ming, Dr. Ying, et al., A New Optimization Method for Horn Designs in Ultrasonic Welding Systems, Singapore Institute of Manufacturing Technology, pp. 1-6 (2002).

"Schweissen, Schneiden, und Siegeln Mittels Utraschall-Beruehrungslos und Verschleissfrei," Deutscher Drucker, Deutscher Drucker Verlagsgesellschaft, Ostfildern, Germany, vol. 31, No. 35, Sep. 21, 2995, p. g29.

Sherrit, Stewart, "Novel horn designs for ultrasonic/ Sonic cleaning welding, soldering cutting and drilling," SPIE smart structure conference, vol. 4701, paper 34, San Diego, CA, Mar. 2002, p. 1-8.

"Velocity", Merriam-Webster dictionary [online], [retrieved from the internet on Apr. 21, 2008], URL http://www.merriam-webster.com/dictionary/velocity, p. 1-2.

Sherrit et al., "Noval Horn Designs for Power Ultrasonics" *Proceedings of the IEEE Ultrasonics Symposium*, Montreal, Canada, 2004.

* cited by examiner

| Freq. | L | Gap |
|---|---|---|
| $f_1$ | $L_1$ | $G_1$ |
| $f_2$ | $L_2$ | $G_2$ |
| $f_3$ | $L_3$ | $G_3$ |
| ⋮ | ⋮ | ⋮ |
| $f_n$ | $L_n$ | $G_n$ |

400

402 — Receive Resonant Frequency (f)

404 — $L = (1/2f) * [(E/\rho)^{1/2}]$

406 — Gap = D-L

| Gap | F | C |
|---|---|---|
| $G_1$ | $F_1$ | $C_1$ |
| $G_2$ | $F_2$ | $C_2$ |
| $G_3$ | $F_3$ | $C_3$ |
| ⋮ | ⋮ | ⋮ |
| $G_n$ | $F_n$ | $C_n$ |

900

US 7,828,192 B2

AMPLITUDE ADJUSTMENT OF AN ULTRASONIC HORN

RELATED APPLICATIONS

This application is related to provisional application Ser. No. 60/640,978, entitled "FREQUENCY BASED CONTROL OF AN ULTRASONIC WELDING SYSTEM," filed Jan. 3, 2005, and provisional application Ser. No. 60/641,048, entitled "GAP ADJUSTMENT FOR AN ULTRASONIC WELDING SYSTEM", filed Jan. 3, 2005, both of which are incorporated herein by reference.

FIELD OF THE INVENTION

The present invention relates to a method and system for determining a gap between a vibrational body and a fixed point, and more particularly to a system and method arriving at such a determination based upon the resonant frequency of the vibrational body.

BACKGROUND

In ultrasonic welding (sometimes referred to as "acoustic welding" or "sonic welding"), two parts to be joined (typically thermoplastic parts) are placed proximate a tool called an ultrasonic "horn" for delivering vibratory energy. These parts (or "workpieces") are constrained between the horn and an anvil. Oftentimes, the horn is positioned vertically above the workpiece and the anvil. The horn vibrates, typically at 20,000 Hz to 40,000 Hz, transferring energy, typically in the form of frictional heat, under pressure, to the parts. Due to the frictional heat and pressure, a portion of at least one of the parts softens or is melted, thus joining the parts.

During the welding process, an alternating current (AC) signal is supplied to a horn stack, which includes a converter, booster, and horn. The converter (also referred to as a "transducer") receives the AC signal and responds thereto by compressing and expanding at a frequency equal to that of the AC signal. Therefore, acoustic waves travel through the converter to the booster. As the acoustic wavefront propagates through the booster, it is amplified, and is received by the horn. Finally, the wavefront propagates through the horn, and is imparted upon the workpieces, thereby welding them together, as previously described.

Another type of ultrasonic welding is "continuous ultrasonic welding". This type of ultrasonic welding is typically used for sealing fabrics and films, or other "web" workpieces, which can be fed through the welding apparatus in a generally continuous manner. In continuous welding, the ultrasonic horn is typically stationary and the part to be welded is moved beneath it. One type of continuous ultrasonic welding uses a rotationally fixed bar horn and a rotating anvil. The workpiece is fed between the bar horn and the anvil. The horn typically extends longitudinally towards the workpiece and the vibrations travel axially along the horn into the workpiece. In another type of continuous ultrasonic welding, the horn is a rotary type, which is cylindrical and rotates about a longitudinal axis. The input vibration is in the axial direction of the horn and the output vibration is in the radial direction of the horn. The horn is placed close to an anvil, which typically is also able to rotate so that the workpiece to be welded passes between the cylindrical surfaces at a linear velocity, which substantially equals the tangential velocity of the cylindrical surfaces. This type of ultrasonic welding system is described in U.S. Pat. No. 5,976,316, incorporated by reference in its entirety herein.

In each of the above-described ultrasonic welding techniques, the workpieces to be joined are disposed between the horn and the anvil, during the welding process. One way to weld is by fixing a gap between the horn and the anvil. The gap between the horn and anvil creates a pinching force that holds the workpieces in place while they are being joined. For the sake of yielding a uniform and reliable welding operation, it is desirable to maintain a constant gap between the horn and the anvil.

During operation, one or more components of the horn stack, including the horn, itself, generally experience an elevation in temperature. Thus, the horn stack generally experiences thermal expansion. As the horn stack expands, the gap between the horn and the anvil is decreased—a result inimical to the aforementioned goal of yielding a uniform and reliable welding operation.

As the foregoing suggests, presently existing ultrasonic welding schemes exhibit a shortcoming, in that the gap between the horn stack and the anvil grows narrower, during successive welding operations.

SUMMARY OF THE INVENTION

Against this backdrop, the present invention was developed. According to one embodiment, a method includes positioning a horn proximal an anvil, so that a gap is established between the horn and the anvil. An alternating current (AC) signal is applied to a converter coupled to the horn. The AC signal exhibits an amplitude. The amplitude of the AC signal is adjusted during operation of the horn, so as to maintain the gap between the horn and the anvil substantially constant.

According to yet another embodiment, a system includes a horn stack held by a mounting system. An anvil is separated from the horn stack by a gap. A power supply is operatively coupled to the horn stack, and configured to supply an alternating current (AC) signal of a given amplitude to the horn stack in response to a command, and is further configured to output data indicating frequency of the AC signal supplied to the horn stack. A controller is operatively coupled to the power supply. The controller is configured to receive the frequency data from the power supply, and to command the power supply to deliver an AC signal of a selected amplitude determined by the frequency data.

DETAILED DESCRIPTION

Figure 1:
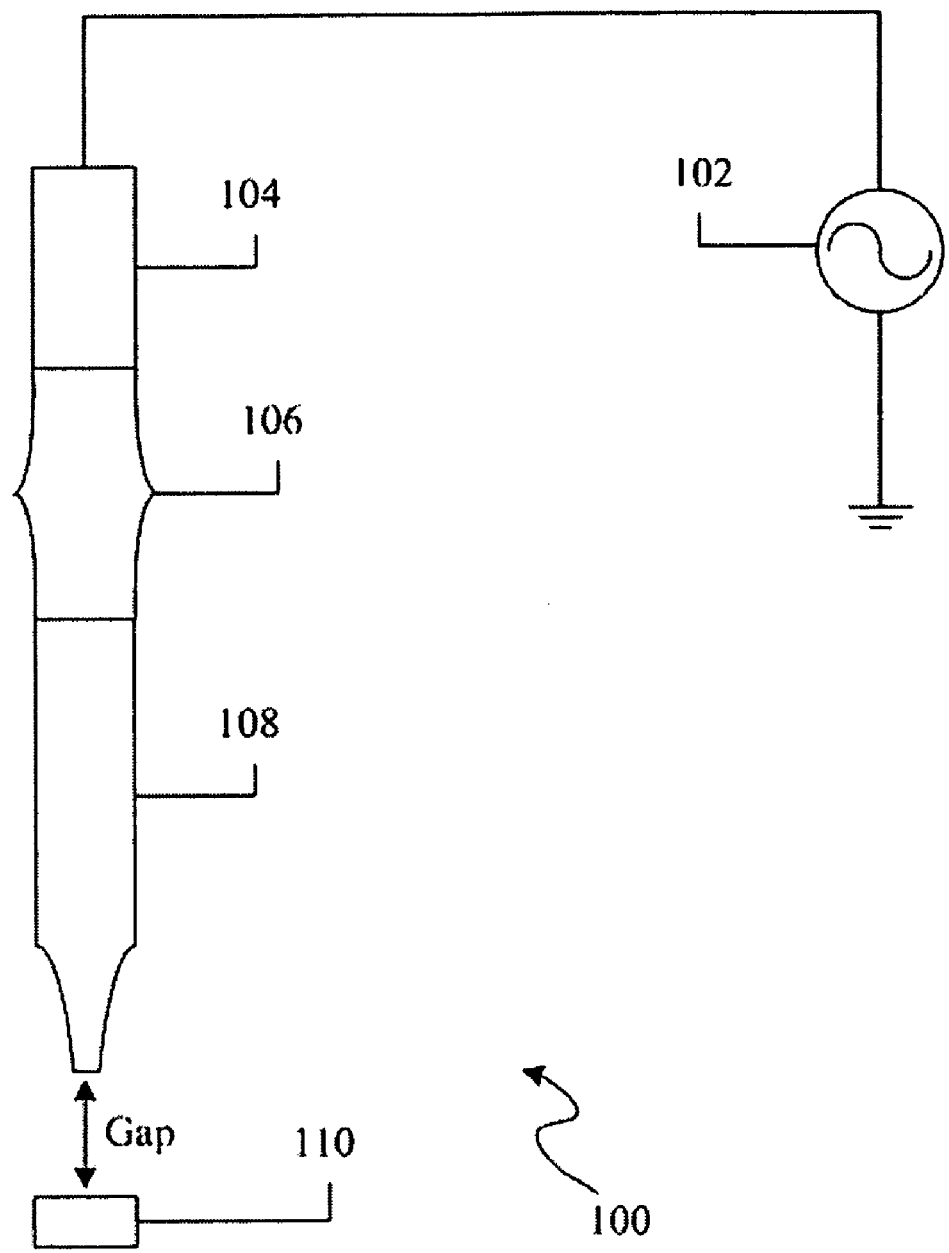
FIG. 1 depicts an embodiment of a simple ultrasonic welding horn stack coupled to an energy source.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

FIG. 1 depicts an example of a simple horn stack 100 that is coupled to an AC source of electrical energy 102. As can be seen from FIG. 1, the horn stack 100 includes a converter 104, a booster 106, and an ultrasonic welding horn 108. During operation, the AC source supplies electrical energy to the converter 104, which responds thereto by compressing and expanding at a frequency equal to that of the AC signal. Therefore, acoustic waves travel through the converter 104 to the booster 106. As the acoustic wavefront propagates through the booster 106, it is amplified, and is received by the welding horn 108. (In some embodiments, the horn 108 is designed to achieve a gain, eliminating the need for a booster 106.) Finally, the wavefront propagates through the horn 108, whereupon it is imparted to workpieces (not depicted in FIG. 1) that are positioned between the welding horn 108 and an anvil 110. Other examples of horn stacks are known in the art, and function with the following systems, schemes, and methods disclosed herein.

The horn 108 is separated from the anvil 110 by a distance labeled "Gap" in FIG. 1. The process of imparting frictional energy to the workpieces causes the various elements of the horn stack 100 to elevate in temperature. As the elements of the horn stack 100 elevate in temperature, they exhibit thermal expansion, meaning that the gap between the horn 108 and the anvil 110 is likely to change in dimension, depending upon the particular manner in which the horn stack 100 is mounted.

Figure 2:
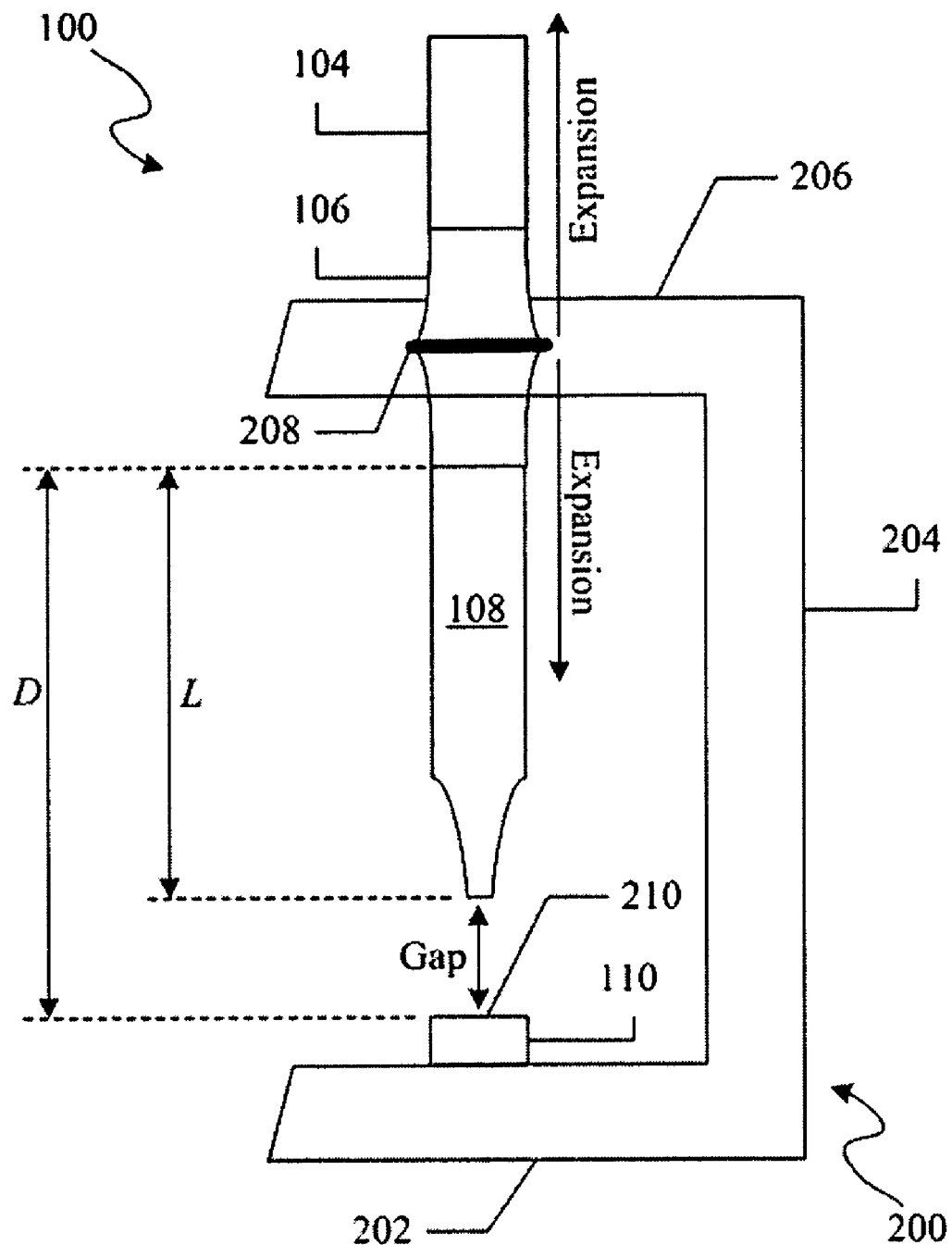
FIG. 2 depicts an embodiment of a mounting system coupled to the ultrasonic welding horn stack of FIG. 1.

FIG. 2 depicts a simplified exemplary mounting scheme for the horn stack 100 of FIG. 1. The mounting scheme makes use of a rigid, generally tripartite, frame 200. The frame 200 includes a first portion 202 upon which the anvil 110 is mounted, and a second portion 206 that is adjoined to a nodal point on the horn stack 100. For example, the second portion 206 of the frame is depicted in FIG. 2 as being coupled to the midpoint 208 of the booster 106. A third portion 204 of the frame 200 extends between the first and second portions 202 and 206.

The mounting system 200 maintains a substantially fixed distance between a workpiece-supporting surface 210 of the anvil 110 and a portion of the horn stack 100. In this case, the mounting system 200 maintains a substantially fixed distance between the upper surface 210 of the anvil 110 and the midpoint/nodal point 208 of the booster 106. Therefore, should the horn stack 100 expand during operation, the horn stack 100 expands outwardly from the midpoint 208 of the booster 106, along the longitudinal axis of the stack 100, as indicated by the arrows labeled "Expansion" in FIG. 2. It is understood that a variety of other mounting systems may also maintain a substantially fixed distance between the upper surface 210 of the anvil 110 and a portion of the horn stack 100, and such other mounting systems are within the scope of the present application.

Given the mounting arrangement of FIG. 2, thermal expansion of the converter 104 and upper portion of the booster 106 produces no effect on the gap length (because of the position of these elements relative to the point 208 at which the frame 200 joins the stack 100, these elements are free to expand upwardly, i.e., away from the anvil 110). On the other hand, the gap length is affected by expansion of the lower portion of the booster 106 and by expansion of the horn 108—as these elements expand, they expand toward the anvil 110, and the gap contracts.

According to one embodiment, the converter 104 and booster 106 are maintained at a substantially constant temperature. For example, the converter 104 and booster 106 may be cooled by a cooling system, such as by one or more fans that circulate relatively cool air to the surfaces of the converter 104 and booster 106, so as to substantially maintain their temperatures, and to thereby substantially suppress their thermal expansion. Therefore, according to such an embodiment, any change in length of the horn stack 100 may be considered as being substantially due to expansion of the welding horn 108.

Furthermore, according to some embodiments, the horn 108 is cooled by a cooling system, so as to suppress or reduce its propensity to heat up during operation. Generally, such a scheme does not totally eliminate thermal expansion of the horn 108, meaning that it still exhibits some degree of thermal expansion, which should be accounted for, if the gap length is to be maintained substantially constant.

It is known that the length of a given body is inversely proportional to the given body's resonant frequency. Stated another way, as a body grows in length, it exhibits a lower resonant frequency. Therefore, as the horn stack 100 grows in length, as occurs, for example, by virtue of thermal expansion, it exhibits a lower resonant frequency. Specifically, the length of a body, l, is related to its resonant frequency, f, by the following equation:

$$l \approx \frac{\sqrt{E/\rho}}{2f},$$

where E represents the modulus of elasticity of the object, and where ρ represents the density of the object. If the object is compound (e.g., is made up of multiple parts or has various sections made from different materials, etc.), E and ρ may be assigned values representing the behavior of the materials, considering its various parts (e.g., may be a weighted average, etc.).

According to some embodiments, the energy source 102 detects the resonant frequency, f, of the horn stack 100, in order to generate an AC signal equal in frequency thereto. For example, the energy source 102 may deliver a sinusoidal signal exhibiting a particular peak-to-peak voltage (or root-mean-square voltage) to the horn stack 100. While keeping the peak-to-peak (or RMS) voltage of the sinusoidal signal constant, the energy source 102 adjusts the frequency of the signal, and seeks out the frequency at which the least current is drawn by the horn stack 100—this frequency is the resonant frequency of the horn stack 100. Accordingly, per such embodiments, the resonant frequency of the stack 100 may be obtained from the energy source 102. According to other embodiments, the resonant frequency of the stack 100 may be detected by observation of the stack 100 with a detector.

Upon obtaining the resonant frequency of the horn stack 100, the overall length of the stack 100 may be obtained by relating, in a manner similar to the aforementioned physical principles, resonant frequency to horn stack length. Given that the converter 104 and booster 106 are cooled, so as to substantially suppress the effects of thermal expansion thereupon, the length of the horn stack 100 can be related to the gap length. For example, according to the scheme of FIG. 2, the gap length and the length of the horn 108, l, are related by the following equation:

gap length≈D−l, where D is an approximately constant value that represents the length between the top of the horn 108 and the workpiece-supporting surface 210 of the anvil 110.

Figure 3:
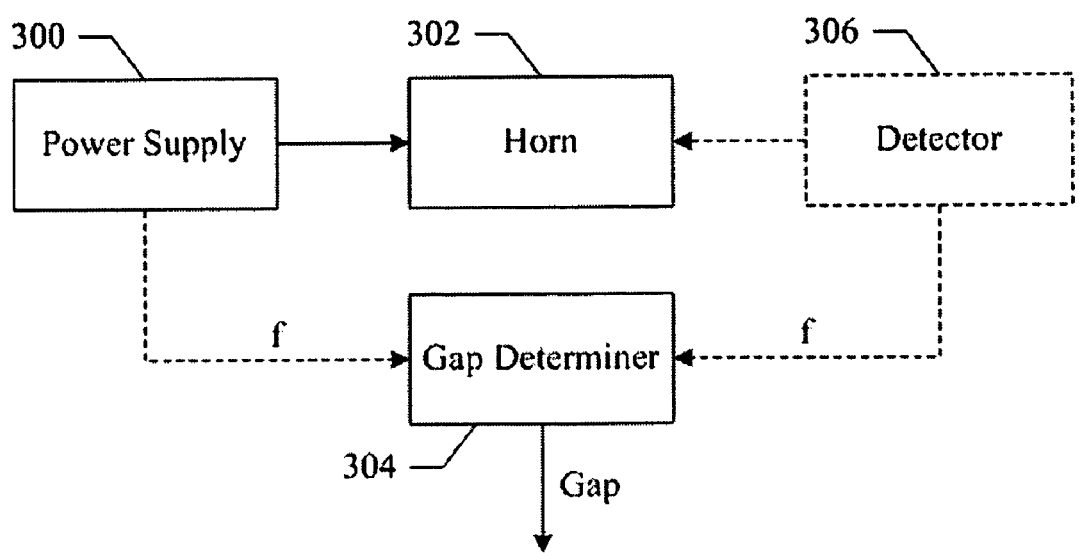
FIG. 3 depicts an embodiment of a system for determining a length of a gap between a horn and an anvil.

FIG. 3 depicts a system for determining the length of the gap between a welding horn 108 and the workpiece-supporting surface 210 of the anvil 110. The system of FIG. 3 includes an ultrasonic power supply 300 (e.g., an electrical power supply that delivers an AC signal to converter, which, in turn, transduces the signal into an acoustic wave) that delivers an acoustic signal to a horn (and booster) 302. The ultrasonic power supply 300 is controlled by a controller circuit, such as by a processor in data communication with a memory device that stores firmware/software controlling the operation of the ultrasonic power supply 300. Alternatively, the controller circuit may be embodied as a hardware-based control loop. In either event, the controller of the ultrasonic power supply 300 identifies the resonant frequency of the horn stack, and commands power supply signal generation circuitry therein to cooperate with the converter to yield an acoustic signal equal in frequency thereto. The controller within the power supply 300 may interface to a gap-determining unit 304.

The gap-determining unit 304 receives the resonant frequency of the horn stack, and generates a quantity standing in known relation to the gap length. According to one embodiment, the gap-determining unit 304 is a software module executing upon a processor coupled to a memory unit. The gap-determining unit 304 may execute upon the same processor upon which the firmware controlling the ultrasonic power supply 300 executes. Alternatively, it may execute upon a different processor that is in data communication therewith. In either event, the software/firmware executed by the gap-determining unit 304 may function according to the schemes (below) discussed with reference to FIGS. 4A-5B.

According to an alternative embodiment, the gap-determining unit 304 may receive the resonant frequency of the horn stack from a source other than the ultrasonic power supply 300. For example, the system may include a detector 306 that observes the horn stack, measures the resonant frequency thereof, and communicates the resonant frequency to the gap-determining unit 304. In the discussion that follows, it is assumed that the resonant frequency originates from the ultrasonic power supply 300, for the sake of example only.

Figures 4A, 4B:
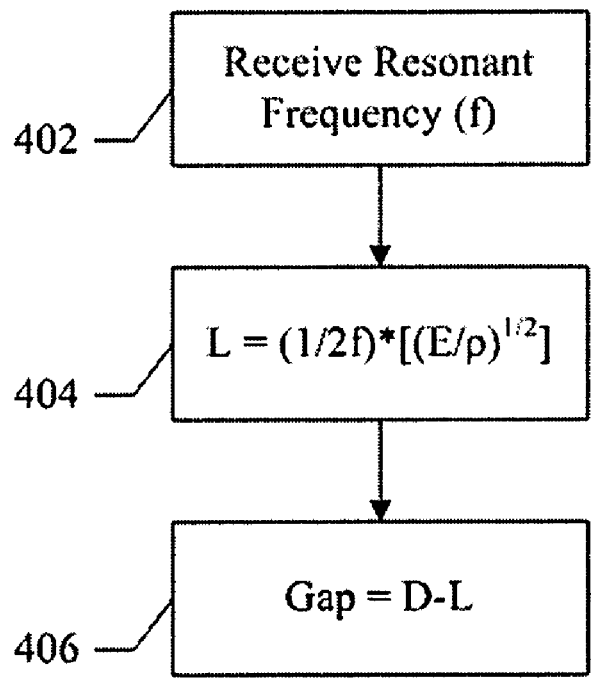
FIG. 4A depicts an exemplary embodiment of a table that may be used as a part of a gap-determining unit.
FIG. 4B depicts an exemplary embodiment of a method of determining a gap length.

FIG. 4A depicts a scheme by which the gap-determining unit 304 may operate. The gap-determining unit 304 may include a table 400 stored in a memory device. The table 400 is organized according to resonant frequency, and relates a gap length G to a resonant frequency, f. Thus, upon receiving a resonant frequency, f the gap-determining unit 304 uses the resonant frequency to access the table 400, and to determine a gap length G corresponding to the resonant frequency, f. For example, assuming that the gap-determining unit 304 receives a frequency of $f_2$ as an input, the unit 304 responds by accessing the table 400 to identify a row corresponding to frequency $f_2$. Upon identification of the row, the gap length entered therein, $G_2$, is returned. Optionally, the table 400 may be accessed to determine the length of the horn stack 100, L, or to determine any other quantity standing in known relation to the gap length. Assuming that the gap-determining unit 304 receives a value $f_x$ as an input, and assuming that $f_x$ falls between successive table entries (i.e., $f_i < f_x < f_{i+1}$), then the gap-determining unit 304 may access the table 400 to obtain gap length values $G_i$ and $G_{i+1}$, and may interpolate between the two values to arrive at a gap length corresponding to the resonant frequency, $f_x$.

The various entries in the table 400 may be populated ex ante by a heuristic process, in which the length of the horn stack 100 and the length of the gap are recorded for each frequency, f, within the table 400. Alternatively, the various entries in the table 400 may be populated by theoretical calculation, in a manner similar to that described above.

FIG. 4B depicts another scheme by which the gap-determining unit 304 may operate, theoretical computation. For example, the gap-determining unit 304 may begin its operation by receiving the resonant frequency of the horn stack 100, f, as shown in operation 402. Thereafter, the unit 304 responds by calculating the length of the horn 108, L, based upon the resonant frequency, such as by use of an equation based upon the physical principles underlying the equation shown in operation 404. Finally, as shown in operation 406, the unit 304 may relate the length, L, determined in operation 404, to a gap length, based upon knowledge of the particular geometric constraints arising from the mounting scheme employed. For example, in the context of the mounting scheme of FIG. 2, the gap length may be found as:

Gap Length=D−L, where D represents the distance between the top of the horn 108 and the workpiece-supporting surface 210 of the anvil 110, and L represents the length of the horn.

Figure 5A:
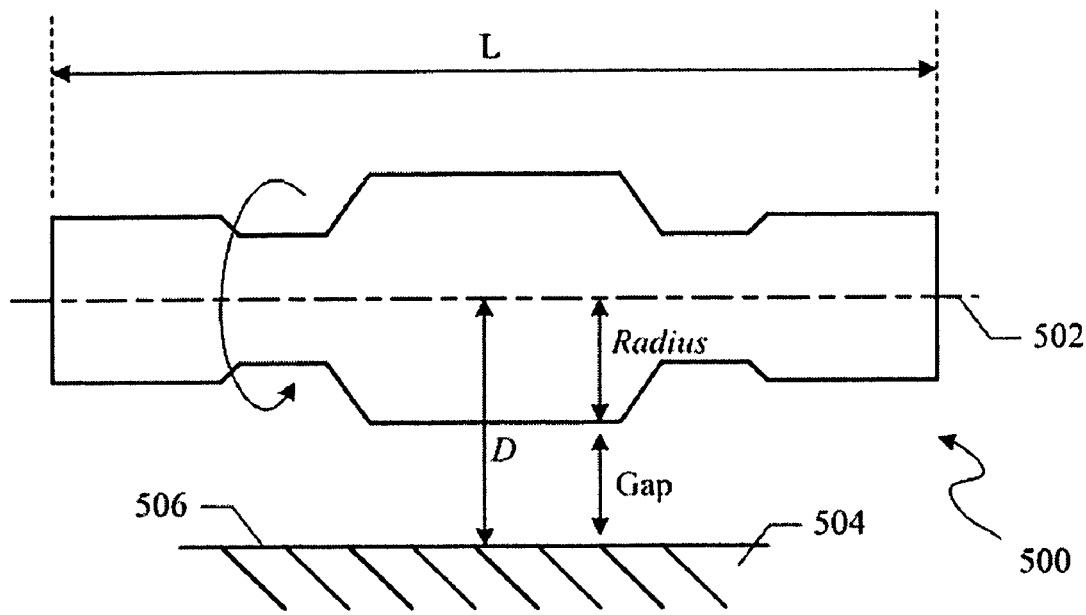
FIG. 5A depicts an embodiment of a simple rotary ultrasonic welding horn for use in a continuous ultrasonic welding operation.

FIG. 5A depicts an example of a welding horn 500 that is used for continuous ultrasonic welding. The horn 500 therein includes a longitudinal axis 502 about which the horn 500 may rotate. The horn 500 is constrained by a mounting system (not depicted in FIG. 5A), so that a gap is maintained between the horn and the anvil 504. The horn stack may be mounted at any nodal point on the system. The longitudinal axis 502 of the horn is substantially parallel to the workpiece-supporting surface 506 of the anvil 504.

Figure 5B:
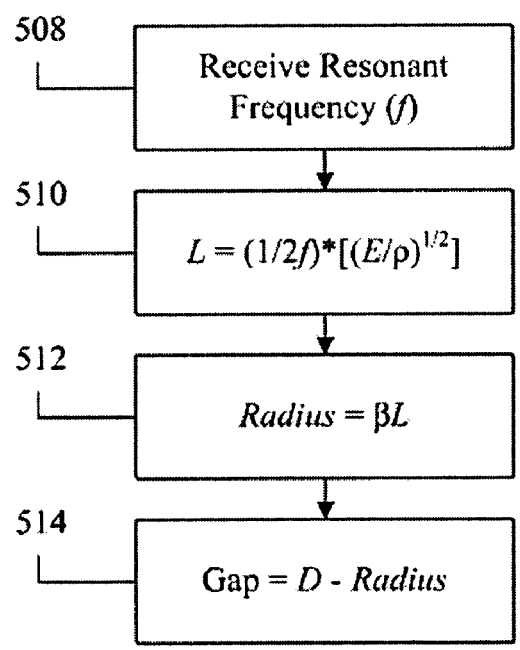
FIG. 5B depicts an exemplary embodiment of a method of determining a gap length.

The aforementioned principle of determining the length of the gap between a horn and an anvil based upon the resonant frequency of the horn stack is applicable to the horn 500 of FIG. 5. As materials expand thermally, they do so in equal proportions in all directions. Therefore, the following technique, depicted in FIG. 5B, may be used to determine the length of the gap between the horn and the anvil.

Initially, as shown in operation 508, the resonant frequency of the horn stack is received. Thereafter, the length of the horn 502, L, is determined based upon the frequency, in like manner as described above (operation 510). As before, the horn stack of FIG. 5A is cooled so that the converter (not depicted in FIG. 5A) and booster (not depicted in FIG. 5A) remain at substantially constant temperatures during operation, thereby suppressing their thermal expansion and the effects on the system resonant frequency.

Since the horn 500 expands proportionally in all dimensions, the ratio between its length, L, and its radius, B, remains constant. Therefore, after calculation of the length of the horn 502, its radius may be arrived at by multiplication of the length by the aforementioned ratio, B, as shown in operation 512. Finally, the length of the gap may be determined by subtracting the radius from the distance, D, between the longitudinal axis of the horn 500 and workpiece-supporting surface 506 of the anvil 504, as shown in operation 514.

It should be noted that the results of the method described with respect to FIG. 5B may be stored within a table, as described with reference to FIG. 4A. Thus, the gap length, or any value standing in known relation thereto, may be obtained by virtue of accessing such a table, based upon the resonant frequency of the horn stack.

Figure 6:
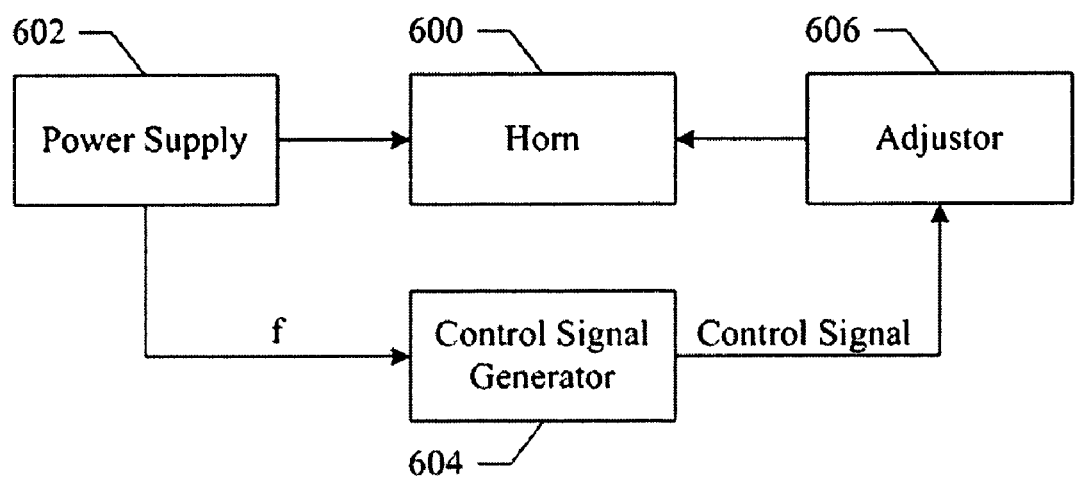
FIG. 6 depicts an exemplary embodiment of a system for maintaining a substantially constant gap between a welding horn and an anvil.

FIG. 6 depicts a control system for maintaining a substantially constant gap between a horn and an anvil, based upon observation of the resonant frequency of the horn stack. The system includes a horn stack 600 and a power supply 602 coupled thereto. According to one embodiment, the power supply 602 determines the resonant frequency of the horn stack 600, as described above.

Coupled to the horn stack is a position adjustor 606. The position adjustor 606 adjusts the horn stack 600, either toward or away from the anvil, under the control of an input signal. A known relationship exists between the input signal delivered to the adjustor 606 and its response thereto. The position adjustor 606 is in data communication with a control signal generator 604. The control signal generator 604 receives the resonant frequency of the horn stack as an input, and generates a control signal that is delivered to the position adjustor 606. The control signal generator 604 yields a control signal that maintains a substantially constant gap between the anvil and the horn, given the resonant frequency of the horn stack 600 and the relationship between the response of the position adjustor 606 and its input signal.

The control signal generator 604 may be embodied as a controller circuit, such as a processor in data communication with a memory device that stores firmware/software in accordance with the aforementioned principles. It may alternatively be embodied as an ASIC yielding the aforementioned control signal so as to maintain a substantially constant gap. In the following portion of the disclosure, a particular embodiment of a position adjustor is disclosed. It is not necessary to use the position adjustor disclosed below for practice of the invention. Also, the preceding portion of the specification was directed toward particular methods of determining the length of a horn or the length of a gap, based upon the resonant frequency of the horn stack. According to other embodiments, such determinations may be arrived at by measurement of the temperature of the horn stack, or of its various components.

Figure 7:
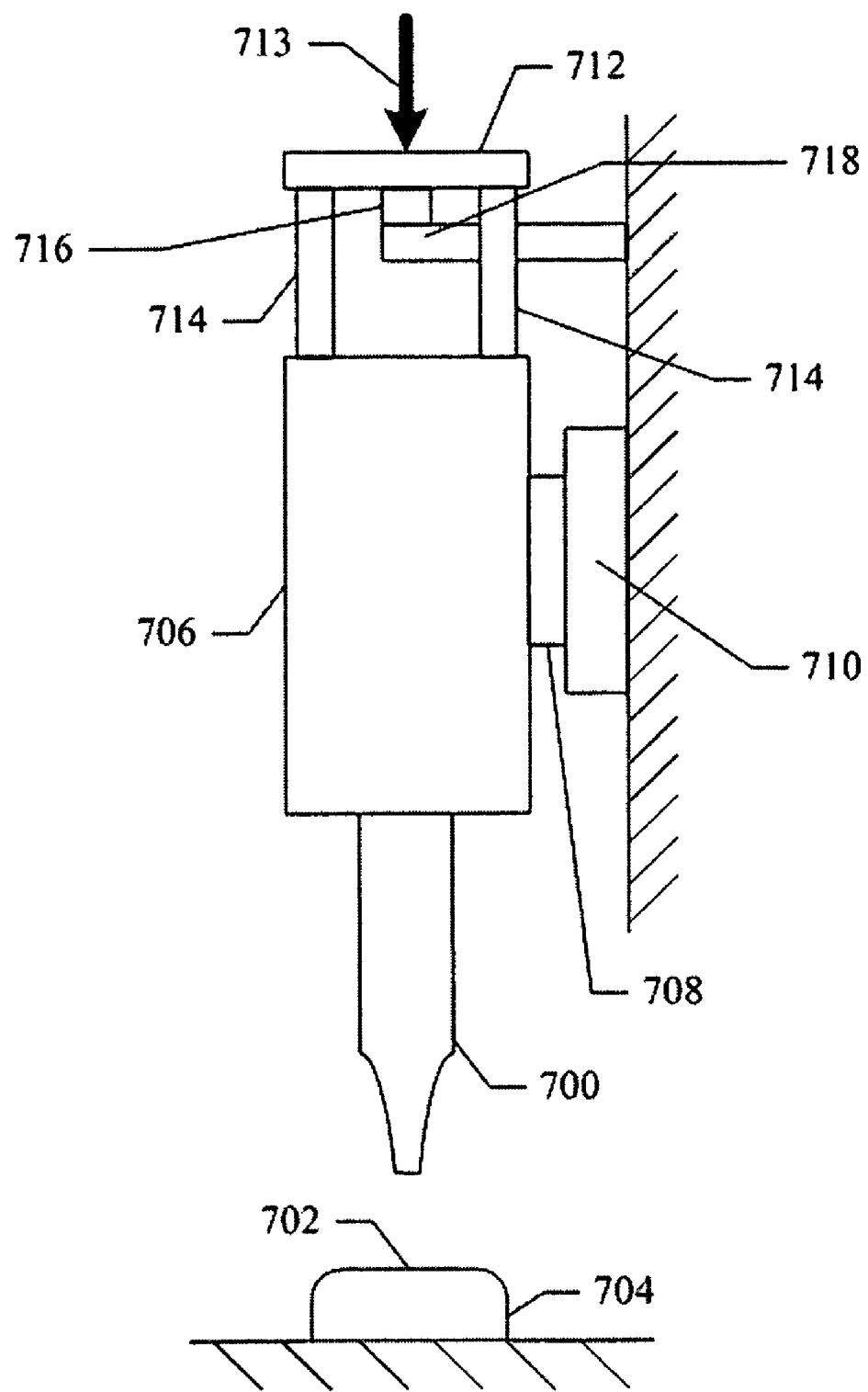
FIG. 7 depicts an exemplary embodiment of a system for adjusting a gap between a horn and an anvil in an ultrasonic welding system.

FIG. 7 depicts an exemplary embodiment of a system for adjusting the gap between a horn and an anvil. The system therein includes a horn 700 oriented above a workpiece-supporting surface 702 of an anvil 704. The horn 700 is rigidly coupled to a frame 706. The frame 706 includes a slide 708 that engages a receiver 710, so that the frame 706 and horn 700 may translate vertically.

The frame 706 also includes a force-receiving plate 712 that is coupled to the frame 706 by a pair of members 714. A force is applied to the force-receiving plate 712 by a force applicator (not depicted in FIG. 7). The force urges the horn 700 toward the anvil 704. The direction of the force is indicated by the arrow 713. The force has the effect of causing a contact surface 716 to abut an elastic deformable stop 718. The force exerted upon the elastic deformable stop 718 causes the stop 718 to deform, and to thereby exhibit a downward deflection (i.e., a deflection in the direction of the anvil 704). Generally, the greater the force applied to the plate 712, the greater the downward deflection exhibited by the stop 718. The greater the deflection exhibited by the stop 718, the smaller the gap between the horn 700 and the anvil 704.

To maintain a constant gap between the horn 700 and the anvil 704, the following scheme may be employed. While the horn 700 is at its unelevated temperature, an initial force is applied to the plate 712, to cause the gap between the horn 700 and the anvil 704 to be established at an "ideal" length. As the horn 700 thermally expands during operation, the gap grows smaller. To counteract this effect, the force applied to the plate 712 is reduced, causing the stop 718 to exhibit a lesser deflection, meaning that the horn 700 and frame are translated upwardly (i.e., away from the anvil). Thus, the gap between the horn 700 and the anvil 704 may be maintained substantially constant by controlled application of force to the plate 712. To ensure the functionality of this scheme the initial force applied to the plate 712 should be of sufficient magnitude to cause the stop 718 to exhibit a deflection at least as great in extent as the expected thermal expansion to be counteracted.

The deformable stop 714 is elastic, and preferably has a relatively high modulus of elasticity. By selection of a material having a relatively high modulus of elasticity, a circumstance is set up in which the force required to deflect the stop 714 is relatively great compared to the process force (i.e., the force exerted by the horn on the workpiece). Such an arrangement provides for ease of control design. According to one embodiment, the stop 714 may be made of steel, or another suitable material. According to one embodiment, the force exerted upon the stop 714 does not cause the material therein to exit its elastic range (i.e., the stop 714 will return to its original shape upon withdrawal of the force). Further, according to one embodiment, the stop 714 exhibits a deflection that is proportional to the force applied thereto, i.e., there exists a linear relationship between the force applied to the stop 714 and the extent of deflection exhibited thereby.

Figure 8A:
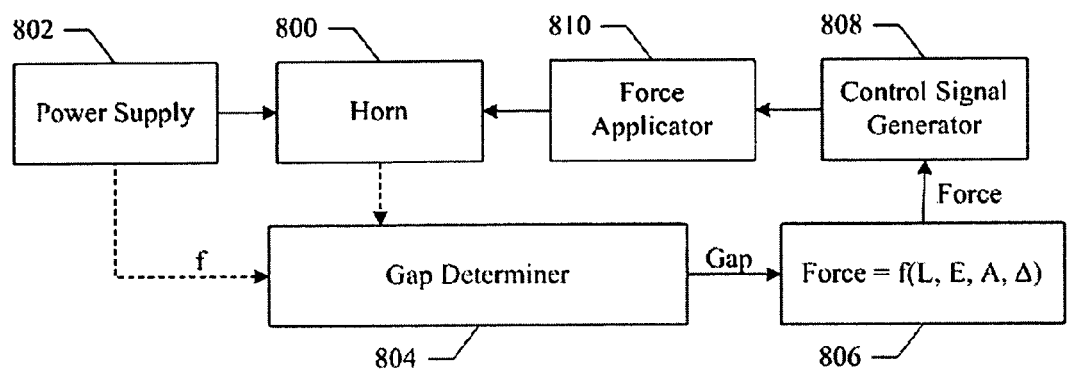
FIG. 8A depicts an exemplary embodiment of a system for maintaining a susbtantially constant gap between a horn and an anvil in an ultrasonic welding system.

FIG. 8A depicts an example of a control system for use with the exemplary adjustment system of FIG. 7. (The various units 804-810 of FIG. 8A, discussed below, may be embodied as software modules stored in a computer-readable medium and executed by a processor, or may be embodied as dedicated hardware, such as one or more application-specific integrated circuits, or as a field-programmable gate array. Further, the units 804-810 may be combined or divided as a matter of design choice.) As can be seen from FIG. 8A, the system includes a horn 800 that is coupled to a source of ultrasonic power 802. A gap-determining unit 804 determines the gap between the horn 800 and an anvil (not depicted in FIG. 8). According to one embodiment, the gap-determining unit 804 obtains the resonant frequency of the horn stack from the power source 802, and determines the gap therefrom. According to another embodiment, the gap-determining unit 804 detects the resonant frequency of the horn 800 by observation thereof. According to yet another embodiment, the gap determining unit 804 arrives at the gap length by measurement of the temperature of the horn, inferring horn length therefrom, and arriving at the gap length on the basis of the horn length.

The gap length arrived at by the gap-determining unit is supplied to a force-determining unit 806. The force-determining unit 806 determines the force to be exerted upon the frame (e.g., plate 712 in FIG. 7), in order to maintain the gap at a substantially constant length. The force arrived at by the gap-determining unit 806 is supplied to a control signal generator 808. The control signal generator 808 develops a control signal, and communicates that control signal to a force applicator 810. The force applicator 810 exhibits a known relationship between the received control signal and the force it exerts. Thus, the control signal generator 808 develops the control signal in light of that relationship.

Figure 8B:
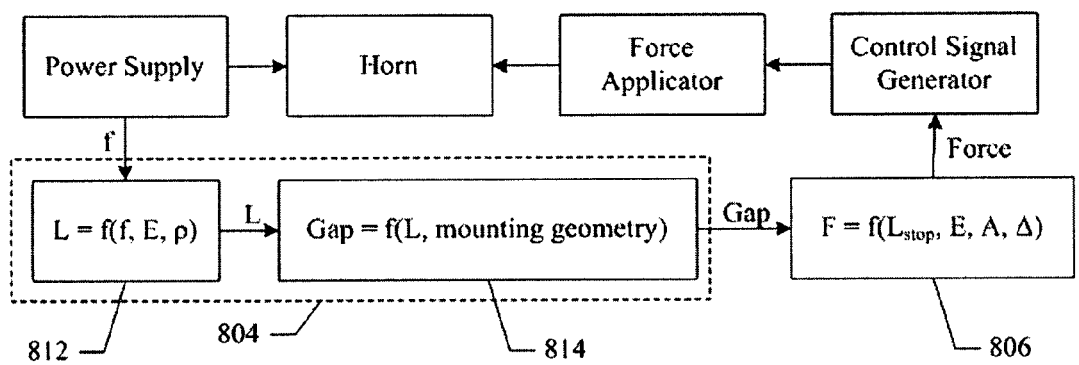
FIG. 8B depicts another exemplary embodiment of a system for maintaining a susbtantially constant gap between a horn and an anvil in an ultrasonic welding system.

FIG. 8B depicts exemplary embodiments of the gap determining unit 804 and force determining unit 806. (As was the case with the units of FIG. 8A, the various units of FIG. 8B, discussed below, may be embodied as software modules stored in a computer-readable medium and executed by a processor, or may be embodied as dedicated hardware, such as one or more application-specific integrated circuits, or as a field-programmable gate array. Further, the units of FIG. 8B may be combined or divided as a matter of design choice.) As can be seen from FIG. 8B, the gap determining unit 804 includes a length determining unit 812 and a gap finding unit 814. The length determining unit 812 receives the resonant frequency of the horn stack, and applies one of the methods described with reference to FIG. 4A and 4B to find the length of the horn. Thereafter, the length of the horn is received by the gap finding unit 814. The gap finding unit 814 arrives at the gap length, by virtue of knowledge of the length of the horn and the particular geometry imposed by the mounting scheme (e.g., the gap length may be equal to the difference between the length from the top of the horn to the workpiece-supporting surface and the horn length, Gap=D−L).

After arrival at the gap length, this value is provided to the force-determining unit 806. The force-determining unit 806 arrives at the force to be applied to the frame, in order to keep the gap substantially constant. The force arrived at is a function of, amongst other things, the length of the stop, $L_{stop}$, the modulus of elasticity of the stop, E, the cross-sectional area of the stop, A, the difference between the initial gap length and the gap length as arrived at by the gap determining unit 804, Δ, and the assembled system deflection.

Figures 9A, 9B:
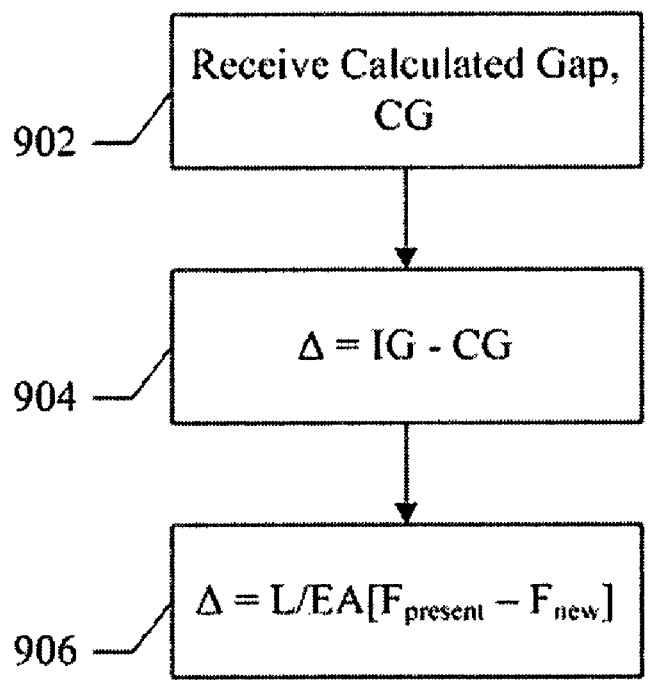
FIG. 9A depicts an exemplary embodiment of a force-determining unit.
FIG. 9B depicts another exemplary embodiment of a force-determining unit.

FIG. 9A depicts a scheme by which the force-determining unit 806 may operate. The force-determining unit 806 may include a table 900 stored in a memory device. The table 900 is organized according to resonant gap length, G, and relates a force F to a gap length, G. Thus, upon receiving a gap length, G, the force-determining unit 806 uses the gap length to access the table 900, and to determine a force F corresponding to the gap length, G. For example, assuming that the force-determining unit 806 receives a gap length of $G_2$ as an input, the unit 806 responds by accessing the table 900 to identify a row corresponding to gap length $G_2$. Upon identification of the row, the force entered therein, $F_2$, is returned. Optionally, the table 900 may be accessed to determine the control signal, C, to be delivered to the force applicator 810, or to determine any other quantity standing in known relation to the force to be exerted on the frame. Assuming that the force-determining unit 806 receives a value $G_x$ as an input, and assuming that $G_x$ falls between successive table entries (i.e., $G_i < G_x < G_{i+1}$), then the force-determining unit 806 may access the table 900 to obtain force values $F_i$ and $F_{i+1}$, and may interpolate between the two values to arrive at a force corresponding to the gap length, $G_x$.

The various entries in the table 900 may be populated ex ante by a heuristic process, in which the force to be applied to the frame and the control signal corresponding thereto are experimentally determined for each gap length, G, within the table 900. Alternatively, the various entries in the table 900 may be populated by theoretical calculation, in a manner similar to that described below with reference to FIG. 9B.

FIG. 9B depicts another scheme by which the force-determining unit 806 may operate, theoretical computation. For example, the force-determining unit 806 may begin its operation by receiving the gap length calculated by the gap determining unit 804, CG, as shown in operation 902. Thereafter, the unit 806 responds by calculating the difference between the initial gap, IG, and the calculated gap, CG, as shown in operation 904. This difference, A, refers to the amount by which the deflection of the stop must be reduced in order to return the gap to its initial length. Thus, in operation 906, the new force to be applied to the frame, $F_{new}$, may be arrived at by solving for $F_{new}$ in the equation shown therein.

Figure 10:
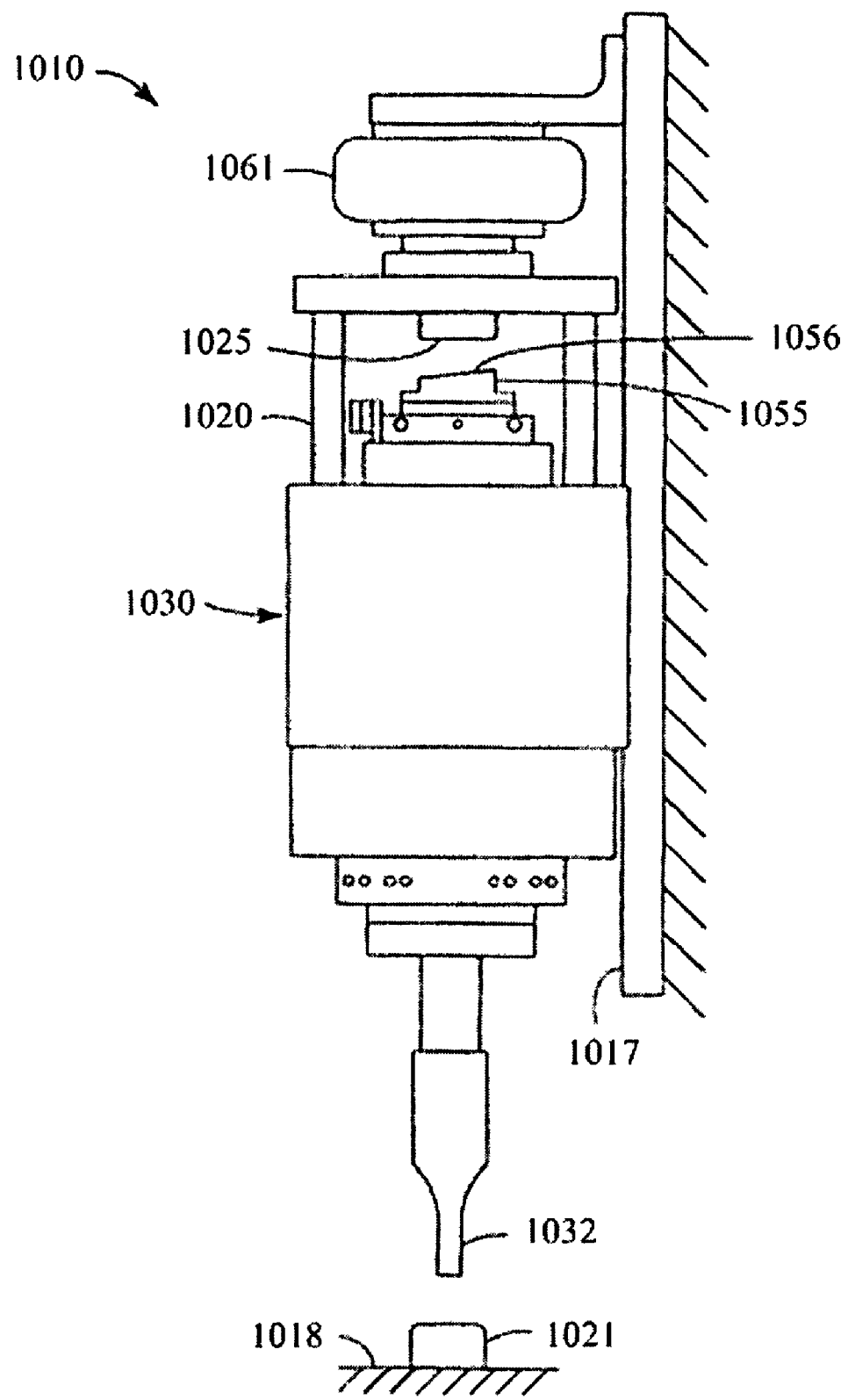
FIG. 10 depicts an exemplary embodiment of a system for adjusting a gap between a horn and an anvil in an ultrasonic welding system.

FIG. 10 depicts another exemplary embodiment of a system for adjusting the gap between a horn and an anvil. Welding system 1010 has a welding system 1030 fixed to support surface 1017 and an anvil 1021 fixed to support surface 1018. Welding system 1030 includes horn 1032, which is supported by horn support 1020 and is moveable in relation to surface 1017, a fixed stop 1055 having support plate 1056, which are fixed in relation to surface 1017, and an expandable pneumatic bladder 1061.

Bladder 1061 is used to apply the force to move horn support 1020 and horn 1032 toward anvil 1021; the force is controlled by adjusting the air pressure in bladder 1061. As surface 1025 contacts fixed stop 1055, support plate 1056 deflects slightly under the applied force.

In one specific example, the minimum allowable force to weld a desired product is 600 pounds (about 272 kg), which is generated by 30-psig (about 207 kPa) air pressure in bladder 161. The desired fixed gap is 0.0020 inch (about 0.05 mm).

In operation with a titanium horn, it was determined that the temperature will increase from room temperature by a maximum of 50° F. (about 27.7° C.), which will increase the horn length by 0.0010 inch (about 0.025 mm). As a result, the gap between horn 132 and anvil 121 is reduced to 0.0010 inch (about 0.025 mm), if no compensation is made. The deflection of support plate 156 is known to be 0.0010 inch (about 0.025 mm) per 675 pounds force (about 306 kg-force). Therefore, the applied force with a room temperature horn must be at least 1125 pounds (about 510 kg), or 60 psig (about 414 kPa). As the horn operates and increases in length, the applied air pressure is reduced from 60 psig (about 414 kPa) to 30 psig (about 207 kPa) to keep the gap between horn and anvil constant.

A welding apparatus, generally configured to control the distance between the anvil and the horn by utilizing a deformable stop assembly, includes an anvil with a fixed stop, a horn, and a force applicator mounted so as to be able to apply force to press the horn against the fixed stop such that elastic deformation of the fixed stop provides fine control over the gap between the horn and the anvil. The apparatus may include a sensing system to monitor a specific property of the horn and control the force applied to the horn so as to hold the gap between the horn and the anvil at a fixed value despite changes in the specific property. The property monitored could be, for example, temperature, length, or vibration frequency of the horn.

The use of a deformable, yet fixed stop to compensate for the horn length increase, due to thermal expansion, can be used with a rotary anvil, stationary anvil, rotary horn, stationary horn, or any combination thereof.

In use, the workpieces to be joined would be positioned between the horn and the anvil, energy would be applied to the horn and the horn would be energized, and a force would be applied to the horn to urge the horn against the fixed stop such that elastic deformation of the fixed stop provides fine control of the gap between the horn and the anvil.

To employ the methods discussed above, one can determine data for a system, and then fit it into equations that can be used in the control system for a particular unit. Applicants have used the following method for the system described above, but this method can be applied to other systems of different configurations. The equations were can be derived using engineering principles or using measured data from an individual system.

Equations 2-5 were best fits to linear systems of the two variables. The slope and intercept of the equations were determined empirically from best fitting measured data of the system. Measuring the relationship between the variables can similarly yield the slope and intercept of any particular system. It is preferred that the systems behave linearly in the operating regions, but if the systems are non-linear, a second order or higher equation can be used.

Applicants have developed and used the method described following for control of a gap during ultrasonic welding.

First, for a rotary ultrasonic system as described above, the following parameters were determined.

(1) Horn diameter=6.880"
(2) Ambient temp. ° F.=65° F.
(3) Frequency at ambient temp.=19.986 KHz
(4) Pressure at which gap is set at=72.5 psig.
(5) Gap set point for the process=2 mils (1 mil=0.001 inch). The material properties of the horn are also known,
(6) Coefficient of Thermal Expansion, $\alpha$ $\alpha_{Titanium}=5.4\times10^{-6}$ deg F./inch/inch $\alpha_{Aluminum}=5.4\times10^{-5}$ deg F./inch/inch When the system is energized and operating, the horn will increase in temperature. So next, one determines what would be the temperature, $T_{final}$, at which there will be no gap left (i.e., 2.0 mil gap goes to zero, e.g., contact between horn and anvil) when welding continuously. This temperature is found by solving Equation 1:

$$T_{final} = \left(\frac{2*IG*10^{-3}}{D*\alpha}\right) \quad \text{(Equation 1)}$$

In Equation 1, $T_{final}$ is the temperature at which the Gap vanishes, IG is the initial gap (in mils) set and measured when the system is set-up and not in operation, D is the outer diameter of the rotary horn, and $\alpha$ is the coefficient of thermal expansion of the horn material. Solving Equation 1 using the above inputs for an aluminum horn gives a temperature of 172.7 deg F. where the gap will go to zero based on heating of the horn during operation. Thus, if the horn heats to 172.67° F., then there will be no gap left. Hence there is an upper bound for temperature. The upper bound for any given system can be found using equation 1 for a rotary system. One of ordinary skill in the art will also appreciate that a similar equation can also be derived for other geometries, and an upper operating temperature for avoiding a vanishing gap can be determined.

As it is difficult to measure the temperature on a dynamic resonating state of a horn, Applicants developed using a surrogate that gives an indirect, but accurate, measurement of temperature. Instead of directly measuring temperature, the frequency of the horn is determined by measuring the frequency of the horn during operation, and then determining temperature by using Equation 2 following:

$$\lambda_{min}=-0.0017*T_{final}+20.096 \quad \text{(Equation 2)}$$

In Equation 2, $\lambda_{min}$ is the minimum frequency at which the horn can be operated before the gap goes to zero, and the coefficients of the linear equations have been determined empirically by experiment. Solving Equation 2 for the input parameters, the gap will go to zero when the frequency of the horn drops to less than 19,802 Hertz. Since the frequency of the horn is a parameter than can be measured easily using standard equipment commonly used by those of ordinary skill in the art, one can determine using Equations 1 and 2 the minimum operating frequency of a rotary system that will keep the gap from closing, which can result in product damage and also damage the horn and/or anvil due to the contact.

Using Equations 1 and 2, one now has the ability to relate gap to temperature and temperature to frequency. Hence, one can relate the gap to frequency. During normal operation, when the material is in the gap (or nip), it is difficult to measure the gap, but using the above principles, the frequency can be used to determine the gap. The relationship between the frequency of the horn and the gap between the horn and anvil can be determined using Equation 3 (which can be solved for either the gap as a function of frequency or vice versa) following:

$$\lambda=0.0965*Gap+19.7925 \quad \text{(Equation 3)}$$

In Equation 3, $\lambda$ is the horn frequency and the Gap is measured in mils (1 mil=0.001 inches). Solving Equation 3 for a gap of 1 mil gives a frequency of 19,889 Hertz. Note that there is now a way to determine the gap change as a function of frequency. Using the information thus determined by Equations 1-3, the force applied to the horn/anvil arrangement can be controlled to keep the operating gap constant as the temperature and frequency of the horn change during operation of the welding assembly.

To control the gap and keep it a constant operating value, the pressure applied to the system is controlled, thereby compensating for thermal expansion of the horn as it heats during operation. Referring back to the example above, when the gap is reduced to 1 mil, one needs to reduce the pressure exerted on the system so that the system can keep or get back to original gap setting of 2 mils. Hence, to compensate for the thermal expansion, the pressure is reduced to get the gap to go back to 2 mils.

To reduce the pressure properly, one first needs to determine the relationship between pressure and frequency, as shown by Equation 4 following:

$$P_{compensation}=-367.3404*\lambda+7412.7731-P_{setpoint} \quad \text{(Equation 4)}$$

where $P_{compensation}$ is the reduction in pressure (in pounds per square inch gage) on the system, λ is the frequency determined from Equation 3, and $P_{setpoint}$ is the pressure at the initial gap set point.

For example, using the above parameters, one can determine the pressure reduction needed to move restore an initial gap of 2 mils when the horn expands 1 mil due to thermal expansion.

Example

What is the Pressure Compensation Needed if the Gap Changed to 1 mil?

First calculate the frequency for gap at 1 mil from Equation (3) (that value is 19.889 KHz, as previously determined). Then substituting the values into Equation 4 yields, $$P_{compensation} = -367.3404\ (19.889) + 7412.7731 - 72.5$$
$$= 106.7399 - 72.5$$
$$P_{compensation} = 34.24\ psig\ \text{(reduction in operating pressure)}$$

After the pressure has been determined, to compensate for thermal expansion, it can be verified what is the gap at that pressure compensation. This gap should be roughly equal to initial gap plus the gap change due to thermal expansion. To verify, first the relationship between the Pressure and Gap is determined by Equation 5 following:

$P_{Compensation}=35.461*(Gap@Pressure Compensation)+142.205$ (Equation 5)

For example, at a pressure compensation of 34.24 psig (from Equation 4), one can rearrange Equation 5 and solve for the Gap:

Gap@Pressure Compensation=(34.24−142.205)/−35.461=3.045 mils

Thus, one can validate the model because the Initial Gap was set at 2.0 mils and the gap change was 1 mil. Therefore, to compensate for a 1 mil expansion due to heating of the horn during operation, one would open the gap by 1 mil, thereby restoring the original 2.0 mil gap.

Thus, using the equations (or deriving their equivalents for linear horns or other geometries) discussed above for determining the operating parameters, one can determine the operating limits for a rotary ultrasonic welding process. For example, the operating temperature limit is found using Equation 1 and value of Gap set point (target). The operating frequency limit of the ultrasonic horn is found using Equation 2 and using the value of Temperature limit from Equation 1. The frequency at gap change is found using Equation 3 and using the value of the gap as input. The temperature at gap change is found using Equation 2, but using the value of frequency determined from Equation 3. The Pressure Compensation for Gap change is found using Equation 4 but using value of Frequency from Equation 3. The Gap at Pressure Compensation (at Ambient Temperature) is found using Equation 5, but using the value of Pressure Compensation from Equation 4.

Figure 11A:
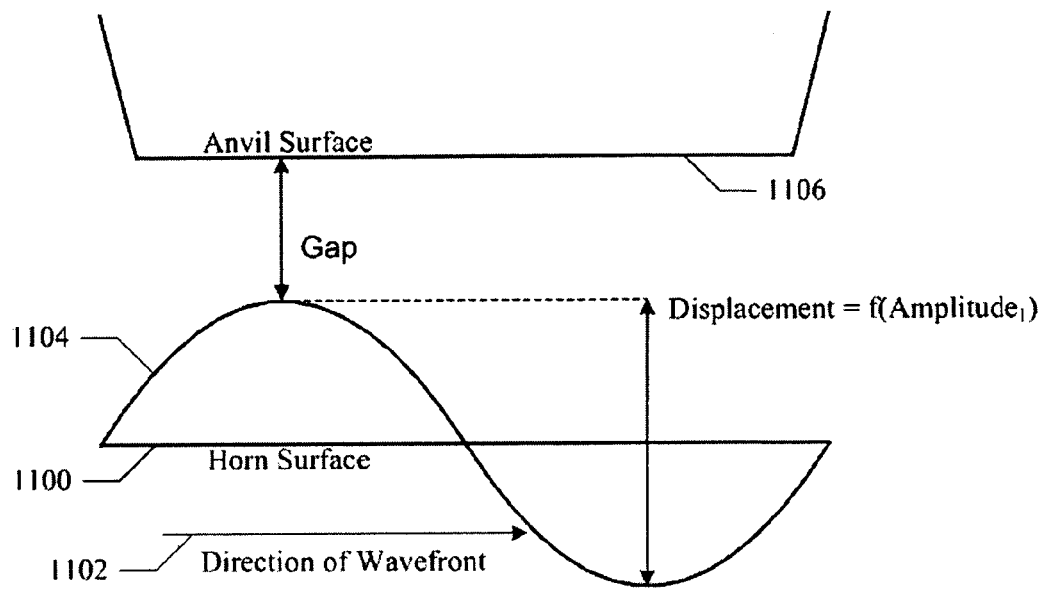
FIG. 11A depicts the surface of a horn driven by an acoustic signal propagating along the longitudinal axis of the horn.

There exists yet another scheme by which the gap between a horn and an anvil may be controlled. As mentioned previously, in the context of ultrasonic welding, a horn is driven by an acoustic signal, generally in the realm of 20,000 to 40,000 Hz. FIG. 11A depicts the surface 1100 of a horn, as an acoustic wave propagates along its longitudinal axis. The direction of propagation of the acoustic wave is depicted by the arrow 1102. As can be seen from FIG. 11A, as an acoustic wave propagates along the longitudinal axis of the horn, the surface 1100 of the horn is perturbed, and exhibits a standing waveform 1104 thereupon. The standing waveform 1104 exhibits a peak-to-peak amplitude, referred to as the "displacement" exhibited by the horn surface. The peak-to-peak amplitude, or surface displacement, is a function of the amplitude of the acoustic signal propagating along the horn. Of course, the amplitude of the acoustic signal is a function of the amplitude of the electrical signal supplied to the converter coupled to the horn. Thus, the displacement exhibited by the surface 1100 of the horn is a function of the amplitude of the electrical signal delivered to the converter. Typically, the greater the amplitude of the electrical signal delivered to the converter, the greater the amplitude of the acoustic signal propagating along the horn; the greater the amplitude of the acoustic signal, the greater the displacement exhibited on the surface 1100 of the horn.

As can be seen from FIG. 11A, the gap between the surface 1100 of the horn and the surface of the anvil 1106 is a function of the displacement. As the horn exhibits greater surface displacement, the gap between the surface of the horn and the surface of the anvil diminishes.

Figure 11B:
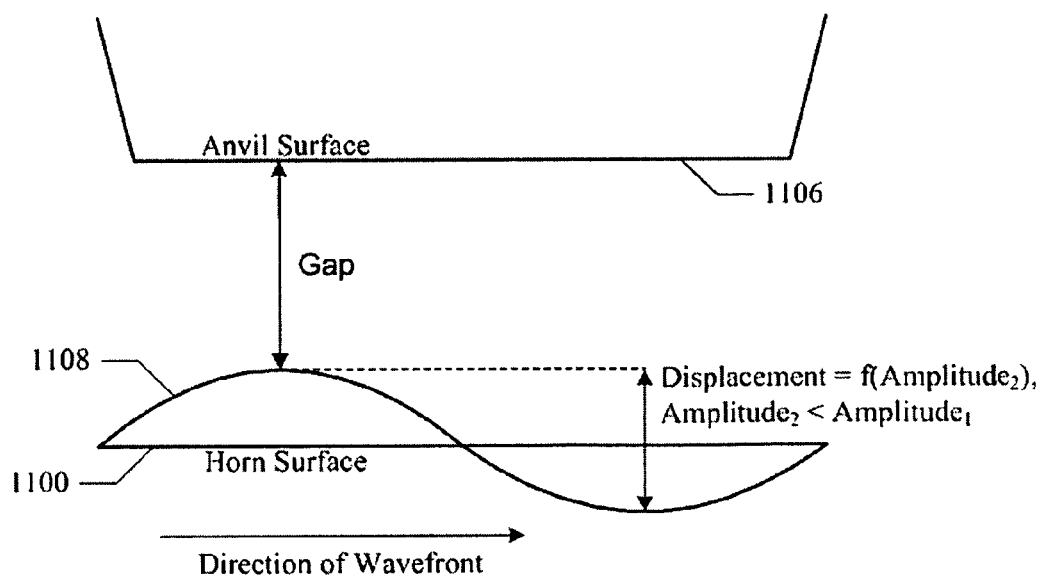
FIG. 11B depicts the surface of a horn driven by an acoustic signal of smaller magnitude than that of FIG. 11A, as that signal propagates along the longitudinal axis of the horn.

Before proceeding further, it is pointed out that FIGS. 11A and 11B are not drawn to scale, and that some features therein, such as the surface displacement have been exaggerated for the sake of illustration. (A typical horn may exhibit a surface displacement of approximately 2-3 mils, when operating under normal conditions, for example.)

For the sake of discussion, the amplitude of the voltage signal stimulating the surface displacement shown in FIG. 11A is termed $Amplitude_1$. FIG. 11B depicts the horn surface 1100 of FIG. 11A, as it appears when stimulated by a voltage signal having an amplitude of $Amplitude_2$ ($Amplitude_2$ is less than $Amplitude_1$). As can be seen from comparison between FIGS. 11A and 11B, the gap between the surface of the horn 1100 and the anvil 1106 grows when the amplitude of the voltage signal stimulating the horn diminishes, because the surface of the horn 1100 is not so greatly displaced toward the anvil.

As mentioned previously, during a typical welding operation, a horn may exhibit a surface displacement on the order of 3 mils, for example. However, the welding operation may yield satisfactory product, even if the surface displacement is reduced by, for example, 33%. Thus, per the aforementioned example, the welding operation may be performed with the horn exhibiting a displacement of as little as 2 mils. It follows, then, that the welding operation may be initiated using an electrical signal of sufficient amplitude to stimulate a surface displacement of 3 mils. During operation, the horn experiences thermal expansion, meaning that the gap between the horn and the anvil diminishes as the horn expands towards the anvil. To counteract this effect, the amplitude of the electrical signal stimulating the horn may be attenuated, so as to yield a surface displacement less than the original 3 mils, thereby maintaining a substantially constant gap. Of course, in the context of an operation that requires at least 2 mils of displacement to produce an appropriate product, the electrical signal should not be attenuated to such an extent that the surface of the horn exhibits less than the required 2 mils of displacement.

Figure 12A:
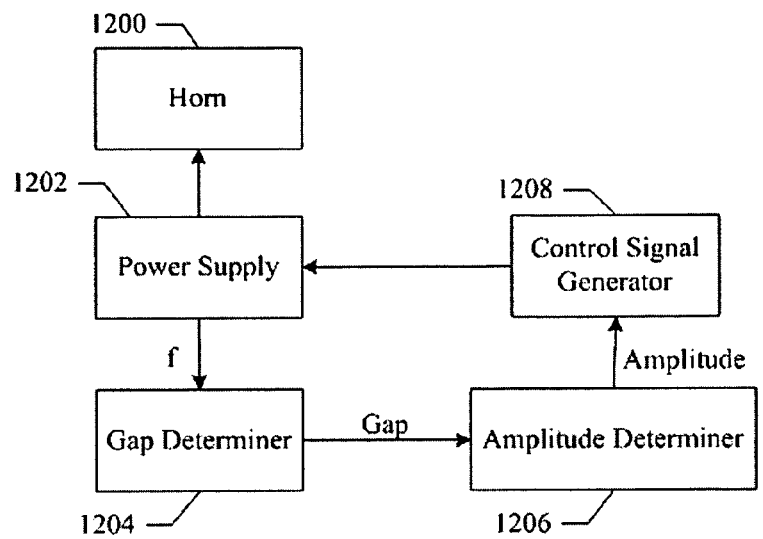
FIG. 12A depicts an exemplary embodiment of a system for controlling the gap between a horn and an anvil.

An exemplary embodiment of a system for controlling the gap between a horn and an anvil is depicted in FIG. 12A. As can be seen from FIG. 12A, the system includes a horn 1200 (which, in turn, includes the converter and booster), which is supplied with an AC electrical signal from a power supply

1202. The power supply 1202 communicates the resonant frequency of the horn 1200 to a gap determining module 1204. (As described previously, the power supply 1202 detects the resonant frequency of the horn stack and drives the horn stack at that frequency.)

The gap determining module 1204 determines the length of the gap (or, may determine the change in the gap, or may determine any other value standing in known relation to the length of the horn), based upon the resonant frequency, as described previously. Thereafter, the gap length (or change therein) is supplied to an amplitude determining module 1206. In response, the amplitude determining module identifies the proper amplitude of the electrical signal to be delivered by the power supply, in order to maintain the gap substantially constant. The amplitude may be retrieved from a look-up table, or may be arrived at by calculation. The amplitude determined thereby is communicated to a control signal generation module 1208, which generates an appropriate command or control signal to cause the power supply 1202 to adjust the amplitude of the signal to that selected by the amplitude determination module 1206.

As described previously, each of the modules 1204-1208 may be embodied as dedicated hardware, such as one or more ASICs cooperating with one another. Alternatively, the modules 1204-1208 may be embodied as software/firmware stored in a memory, and executed by a processor in communication therewith. If embodied as firmware/software, the instructions making up the modules 1204-1208 may be executed by the same processor, or may be executed by a plurality of processors, as a matter of design choice.

Figure 12B:
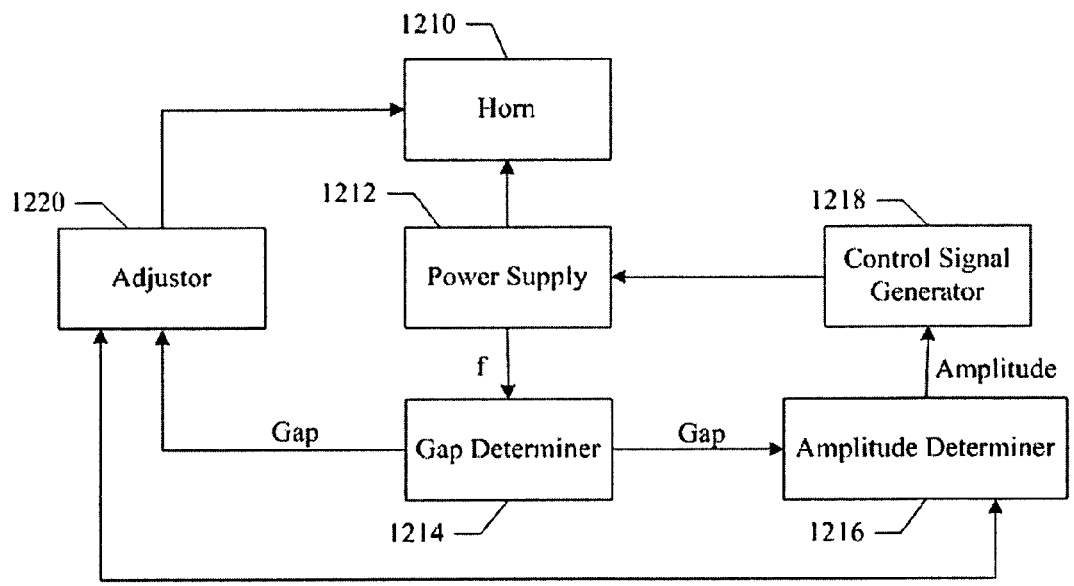
FIG. 12B depicts another exemplary embodiment of a system for controlling the gap between a horn and an anvil.

Another exemplary embodiment of a system for controlling the gap between a horn and an anvil is depicted in FIG. 12B. The system of FIG. 12B takes advantage of two different schemes by which the gap may be adjusted: (1) controlling the position of the horn, itself; and (2) controlling the amount of surface displacement exhibited by the horn. As can be seen from FIG. 12B, the system includes a horn 1210 (which, in turn, includes the converter and booster), which is supplied with an AC electrical signal from a power supply 1212. The power supply 1212 communicates the resonant frequency of the horn 1210 to a gap determining module 1214. (As described previously, the power supply 1212 detects the resonant frequency of the horn stack and drives the horn stack at that frequency.)

The gap determining module 1214 determines the length of the gap (or, may determine the change in the gap, or may determine any other value standing in known relation to the length of the horn), based upon the resonant frequency, as described previously. Thereafter, the gap length (or change therein) is supplied to an amplitude determining module 1216 and to an adjustor 1220. The adjustor 1220 is a system that can alter the position of the horn, such as the adjusting systems shown in FIGS. 7 and 10, which adjust the position of the horn by varying the deformation of an elastic stop by varying degrees. As was the case in the embodiment of FIG. 12A, the amplitude determining module 1216 identifies the proper amplitude of the electrical signal to be delivered by the power supply, in order to maintain the gap substantially constant. However, the amplitude determining unit 1216 cooperates with the adjustor 1220 to jointly adjust the position and/or adjust the amplitude of the AC signal delivered by the power supply 1212, in order to achieve the end goal of substantially maintaining a constant gap.

Figure 13:
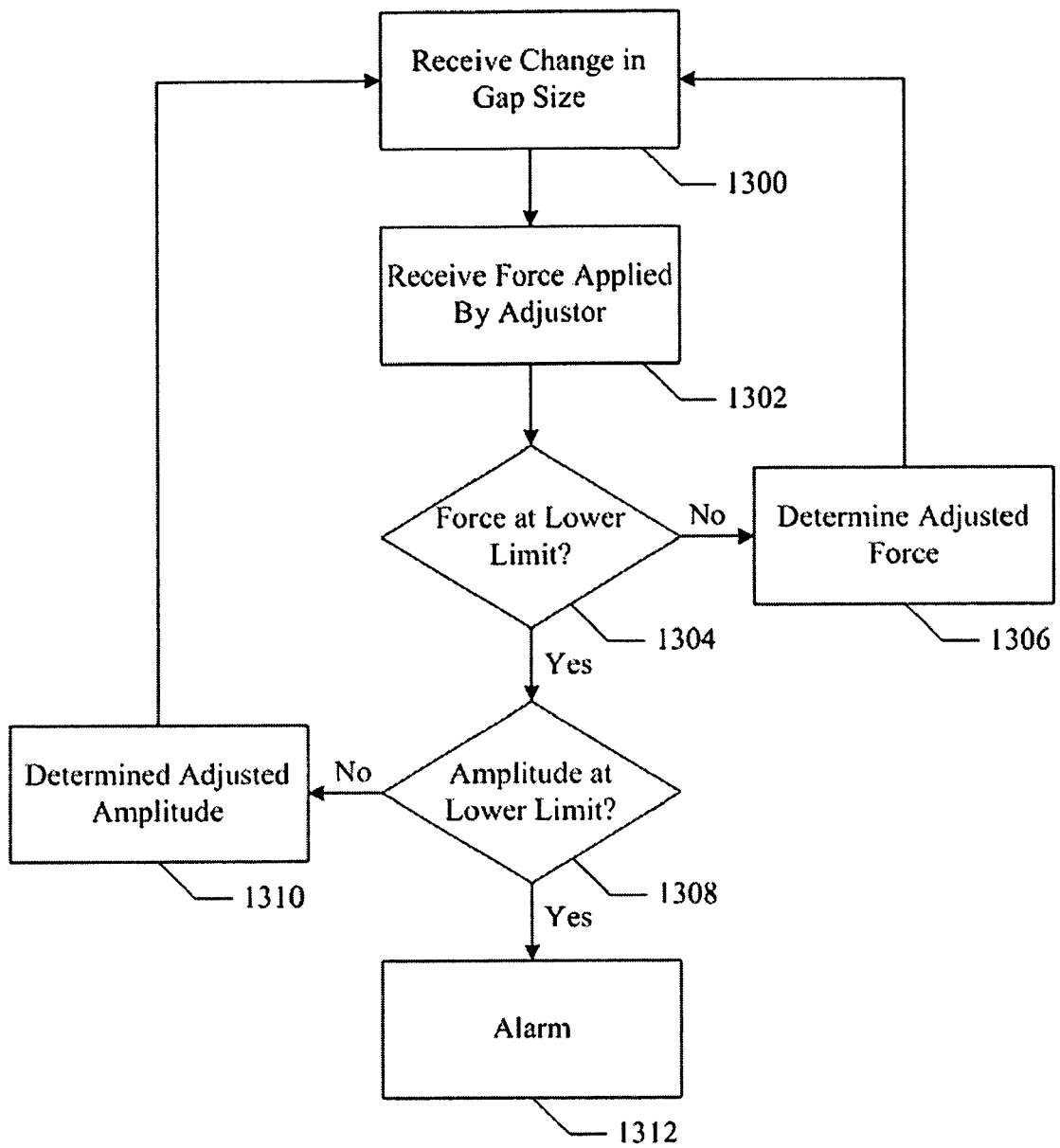
FIG. 13 depicts an exemplary embodiment of a method for combining the operations of an adjustor and an amplitude determination module.

For example, according to one embodiment, the amplitude determination unit 1216 and adjustor 1220 operate according to the method depicted in FIG. 13. As shown therein, both modules 1216 and 1220 receive the gap length, or change therein, from the gap determining unit 1214, as shown in operation 1300. Thereafter, (assuming the embodiment in which the adjustor 1220 comprises a force applicator that forces the horn against a deformable elastic stop), the amplitude determination unit 1216 receives from the adjustor 1220 the force applied thereby (operation 1302). Next, as shown in operation 1304, the force is compared to the lower limit of the acceptable force for the welding operation. If the force is still above the limit, then the adjustor 1220 determines the new force required for application, and adjusts the force accordingly (operation 1306). On the other hand, if the force has reached the lower limit, then the force should not be reduced any further, and control is passed to operation 1308, in which it is determined whether the amplitude of the surface displacement has reached its lower limit. If not, control is passed to operation 1310, whereupon the amplitude determining module 1216 identifies the proper amplitude of the electrical signal to be delivered by the power supply, in order to maintain the gap substantially constant. The amplitude determined thereby is communicated to a control signal generation module 1218, which generates an appropriate command or control signal to cause the power supply 1212 to adjust the amplitude of the signal to that selected by the amplitude determination module 1216. On the other hand, if the amplitude of the surface displacement has reached its lower limit, then control is passed to operation 1312, and an alarm is generated to indicate that the gap cannot be maintained at a constant length without either reducing the process force beneath its acceptable limit, or reducing the surface displacement of the horn beneath its acceptable limit.

Although the operations of FIG. 13 are described as being performed by amplitude determination module 1216, the operations may be performed by any of the modules depicted in FIG. 12B, or may be performed by another module dedicated to coordinating the operations of the amplitude determination module 1216 and the adjustor 1220.

Further, it is to be noted that, in operation 1302, the adjustor 1220 may communicate the position of the horn to the module performing the method of FIG. 13. Then, in operation 1304, the position of the horn may be compared to a positional limit expressing the capacity of the adjustor 1220 to withdraw the horn from the anvil. In other words, in operation 1304, it is determined whether the adjustor 1220 has withdrawn the horn from the anvil as the adjust 1220 is able to do so.

Figure 14:
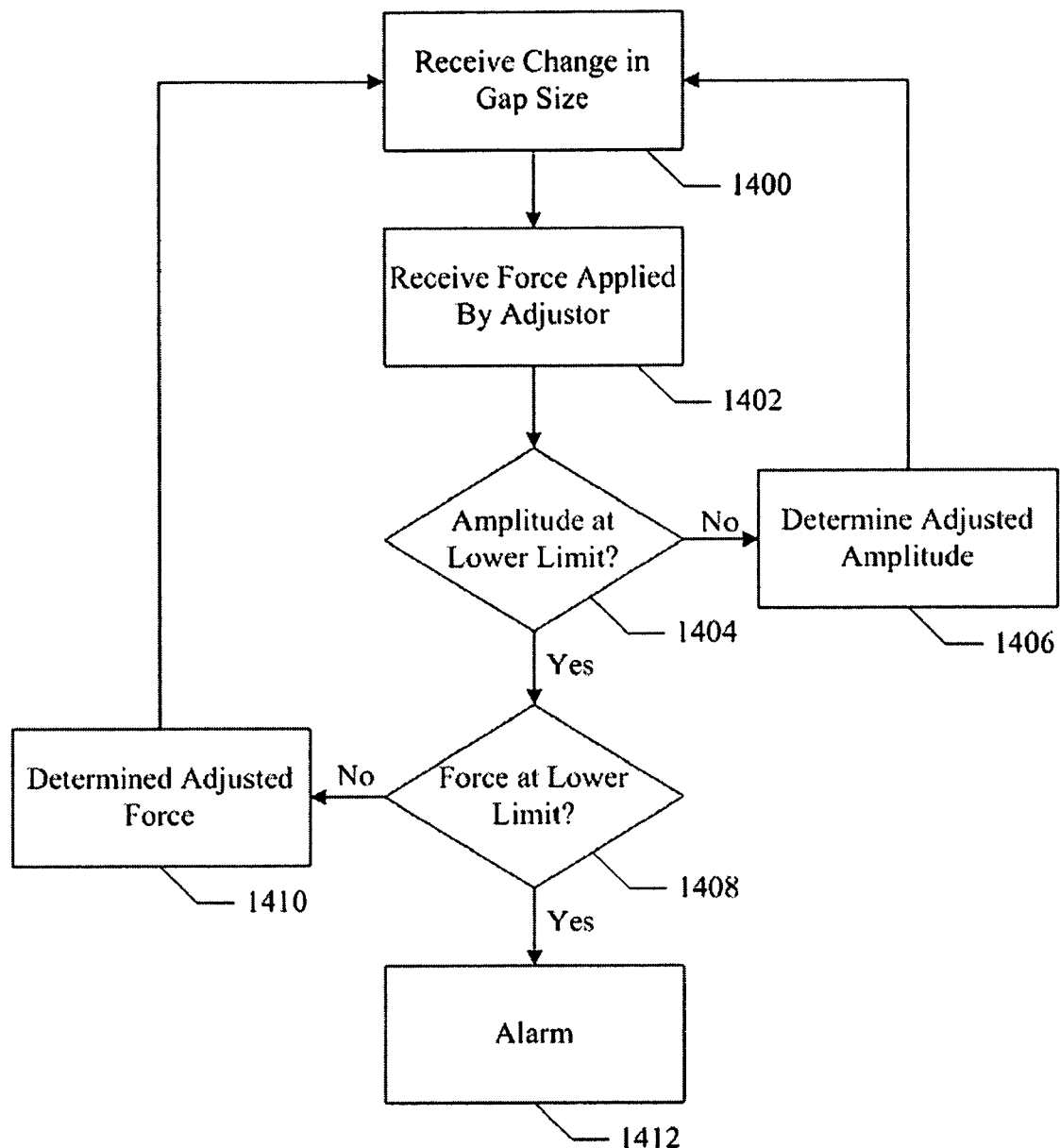
FIG. 14 depicts another exemplary embodiment of a method for combining the operations of an adjustor and an amplitude determination module.

According to another embodiment, the amplitude determination unit 1216 and adjustor 1220 operate according to the method depicted in FIG. 14. As shown therein, both modules 1216 and 1220 receive the gap length, or change therein, from the gap determining unit 1214, as shown in operation 1400. Thereafter, (again assuming the embodiment in which the adjustor 1220 comprises a force applicator that forces the horn against a deformable elastic stop), the amplitude determination unit 1216 receives from the adjustor 1220 the force applied thereby (operation 1402). Next, as shown in operation 1404, whereupon it is determined whether the amplitude of the surface displacement has reached its lower limit. If not, control is passed to operation 1406, whereupon the amplitude determining module 1216 identifies the proper amplitude of the electrical signal to be delivered by the power supply 1212, in order to maintain the gap substantially constant. The amplitude determined thereby is communicated to a control signal generation module 1218, which generates an appropriate command or control signal to cause the power supply 1212 to adjust the amplitude of the signal to that selected by the amplitude determination module 1216. On the other hand, if the amplitude of the surface displacement exhibited by the horn has reached the lower limit, then the force should not be reduced any further, and control is passed to operation 1408, in which it is determined whether the force value received during operation 1402 is at the lower limit of the acceptable force for the welding operation. If the force is still above the limit, then the adjustor 1220 determines the new force required for application, and adjusts the force accordingly (operation 1410). On the other hand, if the force has reached the lower limit, then control is passed to operation 1412, and an alarm is generated to indicate that the gap cannot be maintained at a constant length without either reducing the process force beneath its acceptable limit, or reducing the surface displacement of the horn beneath its acceptable limit.

Although the operations of FIG. 14 are described as being performed by amplitude determination module 1216, the operations may be performed by any of the modules depicted in FIG. 12B, or may be performed by another module dedicated to coordinating the operations of the amplitude determination module 1216 and the adjustor 1220.

Further, it is to be noted that, in operation 1402, the adjustor 1220 may communicate the position of the horn to the module performing the method of FIG. 14. Then, in operation 1408, the position of the horn may be compared to a positional limit expressing the capacity of the adjustor 1220 to withdraw the horn from the anvil. In other words, in operation 1408, it is determined whether the adjustor 1220 has withdrawn the horn from the anvil as the adjust 1220 is able to do so.

Upon reading and understanding the foregoing process for controlling an ultrasonic welding system, one of ordinary skill in the art will appreciate that gap control for a system can be achieved by measuring the operating frequency of the horn, and then adjusting the force, for example, pressure, that controls the gap. The specific equations can be derived or determined empirically for any horn geometry, including linear and rotary horns.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The invention claimed is:

1. A method comprising:
   positioning a horn proximal an anvil, so that a gap is established between the horn and the anvil;
   measuring the resonant frequency of the horn;
   monitoring the gap between the horn and the anvil, based upon a resonant frequency of the horn;
   applying an alternating current (AC) signal to a converter coupled to the horn, the AC signal exhibiting an amplitude; and
   adjusting the amplitude of the AC signal during operation of the horn, so as to maintain the gap between the horn and the anvil substantially constant;
   wherein measuring the resonant frequency of the horn includes maintaining a substantially constant temperature of a converter and a booster connected to the horn by actively cooling a the converter and a the booster connected to the horn.

2. The method of claim 1, further comprising calculating the adjusted amplitude based upon the gap between the horn and the anvil.

3. The method of claim 2, wherein the adjusted urging force is further based upon a relationship exhibited between the amplitude of the AC signal applied to the converter and amplitude of a wave exhibited on the surface of the horn.

4. The method of claim 1, further comprising monitoring the gap between the horn and the anvil, based upon a temperature of the horn.

5. The method of claim 1, further comprising determining a quantity standing in known relation to the adjusted amplitude, based upon the gap between the horn and the anvil.

6. The method of claim 5, wherein the act of determining the quantity standing in known relation to the adjusted amplitude comprises accessing a table to obtain the adjusted amplitude corresponding to the gap.

7. The method of claim 5, wherein the act of determining the quantity standing in known relation to the adjusted amplitude comprises accessing a table to obtain a control signal value corresponding to the gap.

8. The method of claim 1, further comprising:
   adjusting the position of the horn during operation of the horn, so as to maintain the gap between the horn and the anvil substantially constant.

9. The method of claim 8, wherein the position of the horn may be adjusted within a range, and wherein the method further comprises:
   determining whether the horn would have to occupy a position outside of said range, in order to maintain a constant gap between the horn and the anvil; and
   in the event of a positive determination, adjusting the amplitude of the AC signal.

10. The method of claim 1, wherein the amplitude of the AC signal may be adjusted within a range, and wherein the method further comprises:
    determining whether the AC signal would have to exhibit an adjusted amplitude outside of said range, in order to maintain a constant gap between the horn and the anvil; and
    in the event of a positive determination, adjusting the position of the horn during operation of the horn, so as to maintain the gap between the horn and the anvil substantially constant.

11. The method of claim 1, wherein the converter and booster are cooled by circulating air across the surfaces of the converter and booster.

12. The method of claim 1, wherein the gap between the horn and the anvil is less than 0.0762 millimeters (0.003 inches).

13. The method of claim 12, wherein the gap between the horn and the anvil is between 0.0254 millimeters (0.001 inches) to 0.0762 millimeters (0.003 inches).

* * * * *

UNITED STATES PATENT AND TRADEMARK OFFICE
CERTIFICATE OF CORRECTION

PATENT NO. : 7,828,192 B2  
APPLICATION NO. : 11/268141  
DATED : November 9, 2010  
INVENTOR(S) : Donald Larry Pochardt Page 1 of 1

It is certified that error appears in the above-identified patent and that said Letters Patent is hereby corrected as shown below:

Column 6
Line 23, after "f" insert -- , --.

Column 18
Line 2, in Claim 1, after "cooling" delete "a".
Line 2, in Claim 1, after "and" delete "a".

Signed and Sealed this
Twenty-second Day of February, 2011

David J. Kappos
*Director of the United States Patent and Trademark Office*